(12) United States Patent
Vachon

(10) Patent No.: US 9,433,156 B2
(45) Date of Patent: Sep. 6, 2016

(54) SAP COLLECTING ARRANGEMENT

(71) Applicant: LE GROUPE DSD INC., Thetford Mines (CA)

(72) Inventor: Leandre Vachon, Thetford Mines (CA)

(73) Assignee: LE GROUPE DSD INC., Thetford Mines, Quebec (CA)

( * ) Notice: Subject to any disclaimer, the term of this patent is extended or adjusted under 35 U.S.C. 154(b) by 107 days.

(21) Appl. No.: 14/625,581

(22) Filed: Feb. 18, 2015

(65) Prior Publication Data

US 2015/0289457 A1   Oct. 15, 2015

(30) Foreign Application Priority Data

Apr. 10, 2014   (CA) ..................................... 2848568

(51) Int. Cl.
*A01G 23/14* (2006.01)

(52) U.S. Cl.
CPC ..................................... *A01G 23/14* (2013.01)

(58) Field of Classification Search
CPC .............................. A01G 23/14; A01G 23/10
USPC ....................................................... 47/11, 52
See application file for complete search history.

(56) References Cited

U.S. PATENT DOCUMENTS

| | | |
|---|---|---|
| 1,186,741 A | 6/1916 | Brower |
| 2,877,601 A | 3/1959 | Griggs |
| 2,944,369 A | 7/1960 | Soule |
| 2,958,158 A | 11/1960 | Hatton |
| 3,046,698 A | 7/1962 | Breen et al. |
| 3,057,115 A | 10/1962 | Bilanin |
| 3,156,069 A | 11/1964 | Lamb |
| 3,204,370 A | 9/1965 | Lamb |
| 3,469,344 A | 9/1969 | Garvey |
| 4,299,053 A | 11/1981 | Foote |
| 4,366,648 A | 1/1983 | Morin |
| 4,512,104 A | 4/1985 | Lamb |
| 4,884,365 A | 12/1989 | Lesquir |
| 4,887,387 A | 12/1989 | Lesquir |
| 5,054,820 A | 10/1991 | Lesquir et al. |
| 5,224,289 A * | 7/1993 | Buzzell .................. A01G 23/14 285/361 |
| 5,303,504 A | 4/1994 | Buzzell |
| 6,438,895 B1 | 8/2002 | Fortier |
| 6,454,312 B1 | 9/2002 | Desorcy et al. |
| 8,359,788 B2 | 1/2013 | Leger et al. |
| 8,539,712 B2 | 9/2013 | Perkins |
| 8,677,682 B2 | 3/2014 | Cote et al. |
| 2005/0000153 A1* | 1/2005 | White .................... A01G 23/14 47/11 |
| 2015/0040472 A1* | 2/2015 | Perkins .................. A01G 23/14 47/50 |

(Continued)

*Primary Examiner* — Monica Williams
(74) *Attorney, Agent, or Firm* — IPAXIO S.E.N.C.

(57) ABSTRACT

The arrangement (100) includes a sap collecting device (102) and a slide clamp (104). The sap collecting device (102) includes a tubing fixation portion (140) over which the free end of the flexible tubing (106) can be removably inserted with a frictional engagement. The slide clamp (104) includes an annular sleeve portion (180) that is slidingly insertable over the unexpanded outer diameter of the flexible tubing (106) and removably positionable proximate the free end of the flexible tubing (106), when the free end of the flexible tubing (106) is inserted over the tubing fixation portion (140), to constrict the free end in a withdrawal-resisting frictional engagement with the tubing fixation portion (140). The slide clamp (104) also includes a plug portion (182) having an outer peripheral wall surface (206) on which the free end of the flexible tubing (106) is removably insertable to prevent air and contaminants from entering.

20 Claims, 16 Drawing Sheets

(56) References Cited

U.S. PATENT DOCUMENTS

2015/0377399 A1* 12/2015 Vachon .................. A01G 23/14 285/197

2016/0165816 A1* 6/2016 Desorcy ................. A01G 23/14 47/52

* cited by examiner

SAP COLLECTING ARRANGEMENT

CROSS-REFERENCE TO RELATED APPLICATION

The present case claims the benefit of Canadian patent application No. 2,848,568 filed on 10 Apr. 2014, which application is hereby incorporated by reference in its entirety.

TECHNICAL FIELD

The technical field relates generally to arrangements for collecting sap.

BACKGROUND

Many different systems have been proposed over the years for harvesting and collecting sap from trees. Sap is generally harvested using spouts, also sometimes referred to as splines, which are inserted into corresponding tapped holes made on the trunks of trees. The sap flows out of the trees through the spouts and is further collected thereafter. Some implementations use buckets or the like in which the sap can drip by gravity and accumulate underneath the spouts. However, most commercial implementations now use flexible tubing networks operable under vacuum conditions. The sap flowing out of each spout is carried by a corresponding flexible tubing network to a given destination, for example a sap processing unit or to a sap storage unit. The sap processing unit and/or the sap storage unit can be located in a sugarhouse, for instance. Once collected, water can be removed from the sap to concentrate the high-sugar content therein and the concentrated sap can be transformed into various products. For instance, most of the sap from sugar maple trees of a sugar bush can be transformed into food products such as maple syrup. A similar process can be carried out using sap from other kinds of trees, for instance yellow birch, cherry birch, hickory, basswood, etc. Maple trees are thus not the only kinds of trees from which sap could be collected.

The spouts are installed in tapped holes by one or more operators before or during the beginning of the sap harvesting season. The tapped holes are made using a drill bit rotated by a portable electric drill or a similar handheld tool, as well known in the art. The outer diameter of the drill bit somewhat matches the outer diameter of the spout. In practice, the tapped holes are not perfectly circular. They are more or less conical in shape since the drilling motion made by an operator in the field is never perfectly rectilinear.

Conventional rigid spouts are designed to be inserted with force into the tapped holes, for instance using a hammer, to create an interfering engagement between the interior of the tapped holes and the outer surface of the spouts. This forces the tree portions surrounding the tapped holes to expand to yield space for the spouts. It will generally provide a sealed connection between the spouts and their tapped holes even if the tapped holes are not perfectly circular. However, conventional rigid spouts are also prone to ejection from the tapped holes during freeze/thaw cycles of a typical sap harvesting season in a sugar bush, which would break the sealed connection with their tapped hole and sometimes even push them completely out of their tapped hole. Operators tend to insert the spouts very tightly into the tapped holes to mitigate this problem, although operators must still make frequent inspections to reinsert the ones that came out of the tapped holes despite the initial interfering engagement. The forced insertions of the conventional rigid spouts into the tapped holes often causes damages to the trees.

At the end of the sap harvesting season, the spouts must be removed from the tapped holes. Most conventional rigid spouts are generally difficult to remove because they are still well inserted into the tapped holes. The sweet sap also tends to act as an adhesive between the spout and the bark. Using an extraction tool is often required. As a result, portions of the bark around the tapped holes can be damaged during the removal process, which will result in a loss in productivity for the next sap harvesting seasons. The conventional rigid spouts themselves are prone to damages during their removal with an extraction tool.

Each flexible tubing network generally includes different kinds sap collecting devices in addition to the spouts. Sap collecting devices can be defined as devices to which the free ends of the flexible tubings are connected. Examples of devices include connectors, T-connectors, unions, spout elbows, main line couplings, adaptors, fittings, etc. Some sap collecting devices are interposed between two or more lengths of flexible tubings. Yet, these various conventional sap collecting devices typically include a plurality of large circular serrations located on the portion receiving the free end of the flexible tubings to resist dislodging. Once the free ends are in position, they are generally not easy to remove. Nevertheless, all sap collecting devices must eventually be detached from the flexible tubings for a thorough cleaning/sanitization at the end of the sap harvesting season. Furthermore, during the sap harvesting season, operators may need to reconfigure part of the flexible tubing network or to temporarily disconnect some of the flexible tubings, for instance to clear the way for a vehicle. Other situations may exist as well.

Because of the difficulties in removing the free ends of the flexible tubings from conventional sap collecting devices, it is not unusual for operators to cut the flexible tubings close to the free ends so as to facilitate their work. The result is that the individual lengths of the flexible tubing become shorter over the years and the cut tubing portions are wasted. Time is still wasted when the flexible tubing studs are removed from the sap collecting devices once the flexible tubings is cut away. Furthermore, the end portions of the flexible tubings that are located on the serrations are subjected to creep. These serrations tend to be relatively large in diameter and this can speed up the phenomenon. Thus, over time, the material of the end portions is no longer sufficiently elastic and the deformations imposed by the serrations become permanent. These end portions must be cut away.

Clearly, room for many improvements still exists in this technical area.

SUMMARY

In one aspect, there is provided a sap collecting arrangement for directing sap coming from a tapped hole of a tree into an open free end of a flexible tubing operable under vacuum conditions, the flexible tubing having an unexpanded inner diameter and an unexpanded outer diameter, the arrangement including: a sap collecting device having an inner sap channel extending between an inlet and an outlet, the sap collecting device including a tubing fixation portion defining a part of the inner sap channel and over which the free end of the flexible tubing can be removably inserted with a frictional engagement, the tubing fixation portion including an inner peripheral wall surface, an outer peripheral wall surface having a circular cross section, and an opened rear tip defining the outlet of the inner sap channel, the outer peripheral wall surface having at least a section with a diameter larger than the unexpanded inner diameter of the flexible tubing; and a slide clamp having a monolithic construction, the slide clamp including: an annular sleeve portion having an inner peripheral wall surface with a circular cross section, the sleeve portion being slidingly insertable over the unexpanded outer diameter of the flexible tubing and being removably positionable proximate the free end of the flexible tubing, when the free end of the flexible tubing is inserted over the tubing fixation portion, to constrict the free end of the flexible tubing in a withdrawal-resisting frictional engagement with the tubing fixation portion; and a plug portion having an outer peripheral wall surface with a circular cross section, the outer peripheral wall surface of the plug portion having at least a section with a diameter larger than the unexpanded inner diameter of the flexible tubing and on which the free end of the flexible tubing is removably insertable with a frictional engagement to prevent air and contaminants from entering.

In another aspect, there is provided a method of connecting free ends of flexible tubings to sap collecting devices, as described and/or suggested herein.

Further details on these aspects as well as other aspects of the proposed concept will be apparent from the following detailed description and the appended figures.

DETAILED DESCRIPTION

Figure 1:
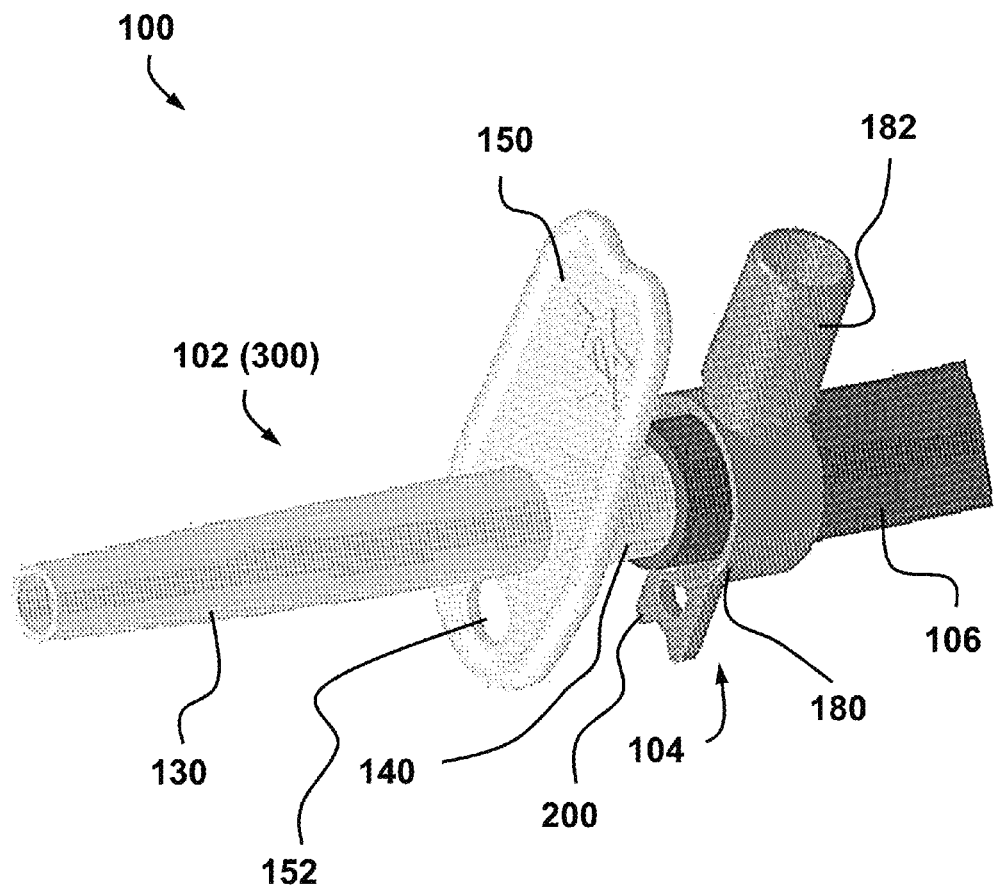
FIG. 1 is an isometric view illustrating an example of a sap collecting arrangement as proposed herein, the sap connecting device of this arrangement being a spout.

FIG. 1 is an isometric view illustrating an example of a sap collecting arrangement 100 as proposed herein. The arrangement 100 is part of a system for harvesting sap from trees, for instance sweet sap from sugar maple trees or other kinds of trees. The sap is harvested from each tree using one or more active tapped holes and a corresponding number of spouts.

The arrangement 100 includes a sap collecting device 102 and at least one slide clamp 104. The sap collecting device 102 is a spout in FIG. 1. Other kinds of sap collecting devices are possible as well. For instance, the sap collecting device can be other parts of the flexible tubing networks such as connectors, T-connectors, unions, spout elbows, main line couplings, adaptors, fittings, etc. The sap collecting device 102 of FIG. 1 will now be generically referred to hereafter as the "spout 300" in this figure and in some of the subsequent figures for the purpose of the explanation. Also, the exact shape and configuration of the spout 300 can vary from one implementation to another. It is thus not limited to the one shown and described herein.

The arrangement 100 creates a removable connection for the open free end of an elongated flexible tubing 106. The flexible tubing 106 is part of a flexible tubing network operable under vacuum conditions. In sap harvesting systems, there are generally a large number of these flexible tubings 106. With the sap collecting devices 102, the flexible tubings 106 form together what is generically referred to as being a network. The network allows the spouts 300 to be in fluid communication with the given destination. The vacuum conditions can be created using one or more air pumps provided at or near the downstream end of the flexible tubing network. Variants are possible as well.

The flexible tubing 106 to be used with the arrangement 100 will generally be one made of a polymeric material, such as a transparent or translucent plastic material. Nevertheless, variants are possible as well.

The flexible tubing 106 has an inner diameter and an outer diameter. The inner diameter forms an internal channel extending over the entire length of the flexible tubing 106. The free end is connected to the sap collecting device 102, namely to the spout 300 in the example shown in FIG. 1, by inserting a portion of the spout 300 into the internal channel. This portion has a slightly larger diameter and this creates a frictional engagement. The inner and outer diameters of the unconnected flexible tubing 106, i.e. before the insertion of an element into the free end thereof, are referred to as the unexpanded inner diameter and the unexpanded outer diameter, respectively. In use, the presence of the flexible tubing 106 over the corresponding portion of the spout 300 will slightly increase the inner and outer diameters of the flexible tubing 106 in size. These are referred to as the expanded inner diameter and the expanded outer diameter, respectively.

Figure 2:
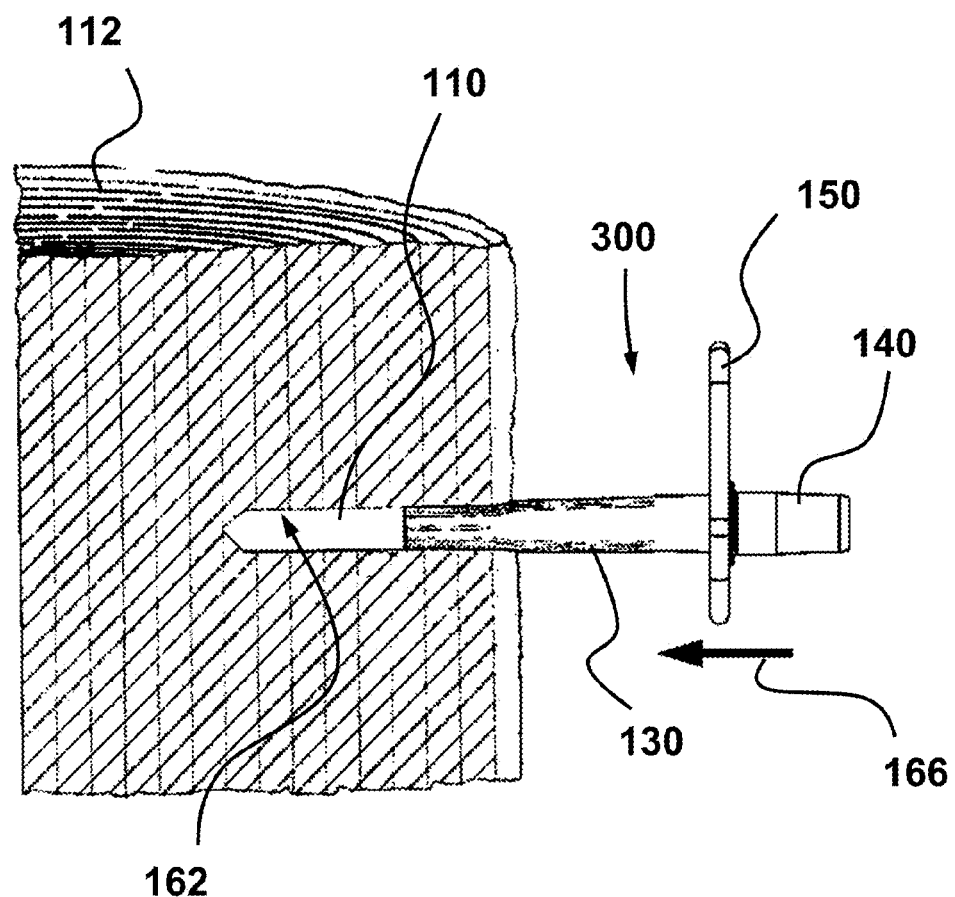
FIG. 2 is a semi-schematic side view illustrating the spout shown in FIG. 1 once inserted into a tapped hole of a tree.

FIG. 2 is a semi-schematic side view illustrating the spout 300 shown in FIG. 1 once inserted into a tapped hole 110 of a tree 112. The tree 112 can have one or more tapped holes at the same time, depending on various factors, thus have simultaneously more that one spout 300. Only one is shown for the sake of simplicity.

Figure 3:
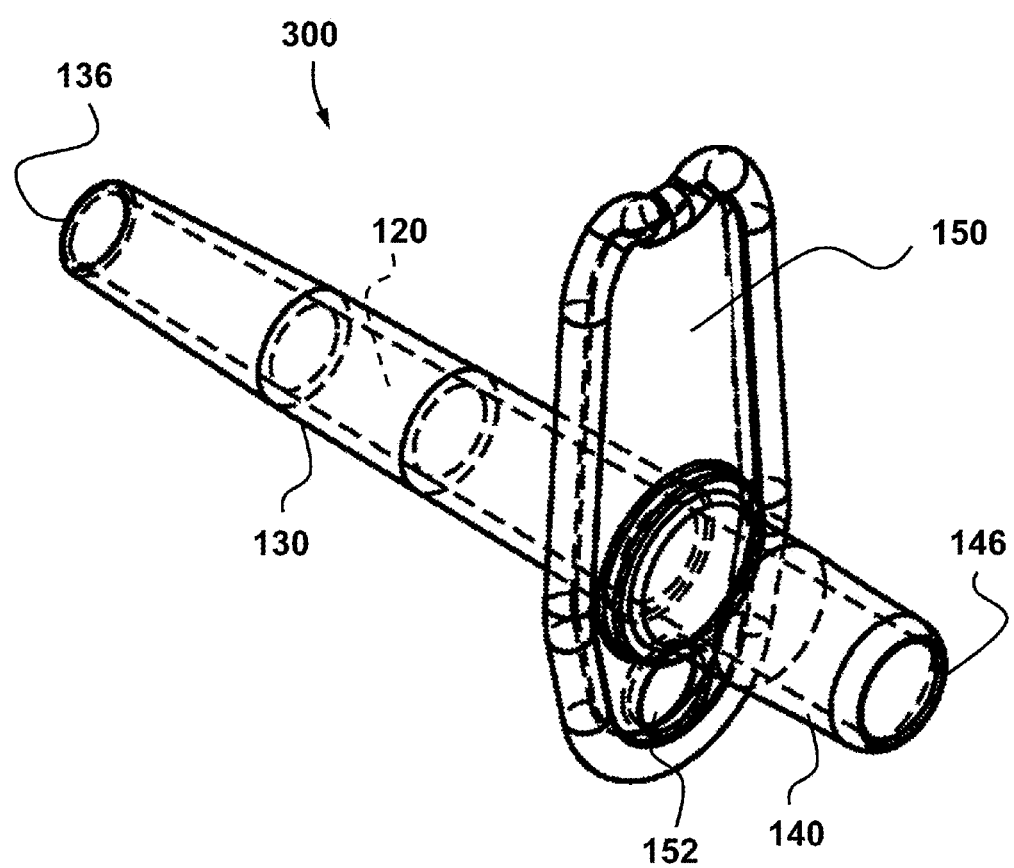
FIG. 3 is an isometric rear view of the spout shown in FIG. 1.

FIG. 3 is an isometric rear view of the spout 300 shown in FIG. 1.

The illustrated spout 300 has a monolithic construction. It can be made of a plastic material using, for instance, an injection-molding process. The plastic material can be a transparent plastic material, as shown. This way, during the sap harvesting season, the operator can see the sap flowing through the spout 300. Nevertheless, using a translucent or opaque material for the spout 300 is still possible. Other variants are possible as well.

Figure 4:
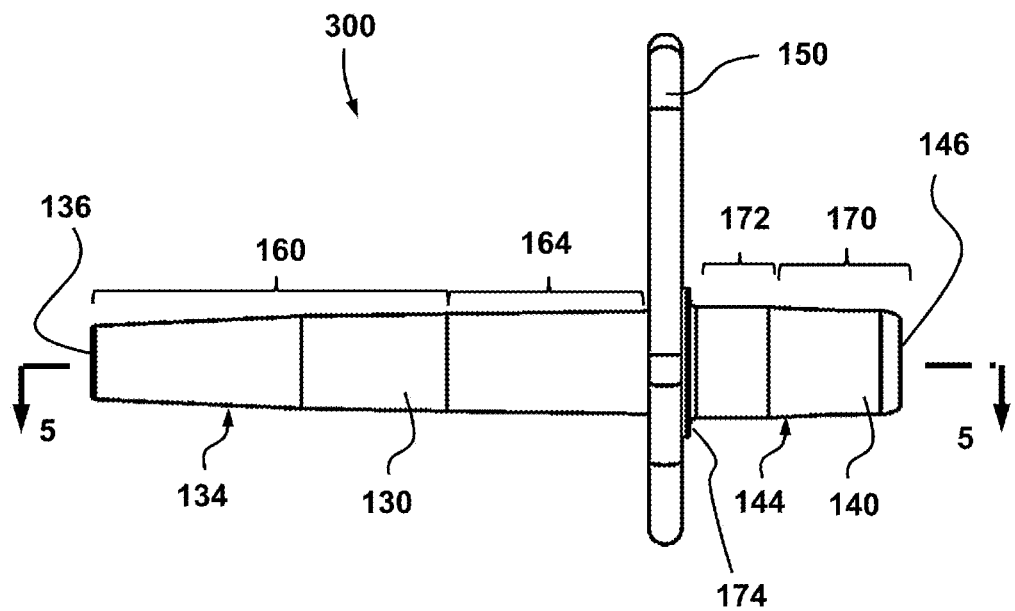
FIG. 4 is a side view of the spout shown in FIG. 1.

FIG. 4 is a side view of the spout 300 shown in FIG. 1.

Figure 5:
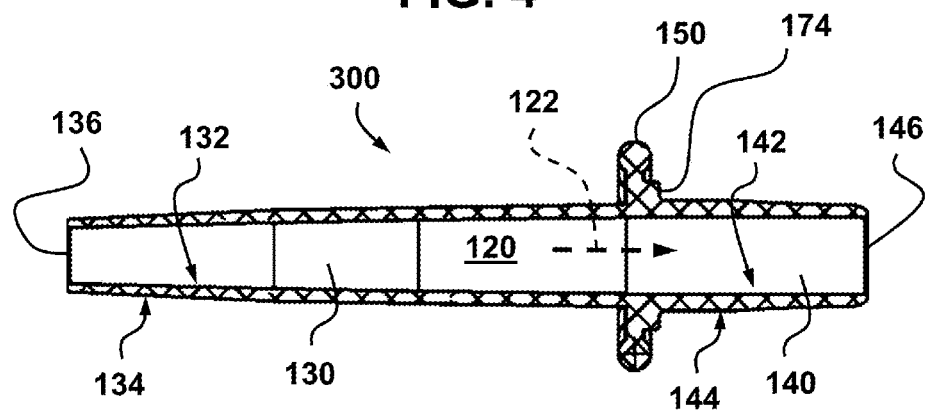
FIG. 5 is a cross-sectional view of the spout taken along line 5-5 in FIG. 4.

FIG. 5 is a cross-sectional view of the spout 300 taken along line 5-5 in FIG. 4. As can be seen, the spout 300 has an inner sap channel 120 extending between an inlet and an outlet. In use, the sap will flow from the front to the rear of the spout 300 in direction of arrow 122.

The illustrated spout 300 includes an elongated tubular portion 130. This tubular portion 130 defines a part of the inner sap channel 120. The tubular portion 130 includes an inner peripheral wall surface 132, a smooth outer peripheral wall surface 134 and an opened front tip 136. The opened front tip 136 defines the inlet of the inner sap channel 120, thus the inlet of the illustrated spout 300. The inner peripheral wall surface 132, the outer peripheral wall surface 134 and the outer perimeter of the opened front tip 136 all have a circular cross section in the illustrated example. However, one can use a different configuration for the inner peripheral wall surface 132. Other variants are possible as well.

The illustrated spout 300 further includes a tubing fixation portion 140 defining a second part of the inner sap channel 120 and over which the free end of the flexible tubing 106 can be removably inserted. The tubing fixation portion 140 includes an inner peripheral wall surface 142, a smooth outer peripheral wall surface 144 with a circular cross section, and an opened rear tip 146. The opened rear tip 146 defines the outlet of the inner sap channel 120. The outer peripheral wall surface 144 of the tubing fixation portion 140 has at least a section where its diameter is slightly larger than the unexpanded inner diameter of the flexible tubing 106 to create an interfering engagement. Variants are possible as well.

It should be noted that depending on the nature of the sap collecting device, the sap collecting device can have more than one tubing fixation portion 140.

The inner sap channel 120 of the illustrated spout 300 is substantially rectilinear between its inlet end and its outlet end. The longitudinal axis of this spout 300 is thus substantially rectilinear. Both the tubular portion 130 and the tubing fixation portion 140 are coaxial with this longitudinal axis. The various wall surfaces are symmetric with reference to this longitudinal axis. Nevertheless, variants are possible as well.

The illustrated spout 300 also includes a handgrip 150 in the form of a substantially flat outer flanged wall located between the tubular portion 130 and the tubing fixation portion 140. The handgrip 150 projects substantially at right angle with reference to the longitudinal axis of the spout 300. The inner sap channel 120 is offset with reference to the geometric center of the handgrip 150 and the upper portion thereof is preferably longer than its bottom portion to create a lever. The edges around the periphery of the handgrip 150 of the illustrated example are also smooth and rounded. This way, the handgrip 150 can be held by fingers of the operator to easily remove the spout 300 from the tapped hole 110 at the end of the sap harvesting season without using any tool. The spout 300 only needs to be slightly rotated, for instance of a quarter of a turn, as the spout 300 is being pulled. This technique mitigates damages to the trees since it prevents portions of the bark around the tapped hole 110 from detaching during the removal of the spout 300.

It should be noted that the handgrip 150 can be designed with another shape.

If desired, the bottom portion of the handgrip 150 can include a hole 152, as shown. The hole 152 can be used for instance to receive a hook for suspending a bucket under the spout 300 and collect the sap therein. It is also possible to suspend the bucket directly on the tubular portion 130 without using the hole 152. The tubular portion 130 can be inserted through the side hole of the bucket before the spout 300. The bucket can then be emptied by rotating it around the spout 300.

The outer peripheral wall surface 134 of the illustrated spout 300 has a diameter that is generally increasing from the opened front tip 136 rearwards. In this example, the diameter increases along a front section 160. This front section 160 is partially and removably insertable into the tapped hole 110 of the tree 112 with a frictional engagement generated by a contact of the outer peripheral wall surface 134 with an inner surface 162 of the tapped hole 110.

Furthermore, the inner peripheral wall surface 132 of the tubular portion 130 has a diameter that is generally increasing from the opened front tip 136 rearwards. The internal widening of the inner sap channel 120 promotes the aspiration of the sap when operating under vacuum conditions. The combined variations of the diameters of the inner peripheral wall surface 132 and the outer peripheral wall surface 134 are such that the wall thickness between its inner peripheral wall surface 132 and its outer peripheral wall surface 134 generally increases in the lengthwise direction. The thickness is preferably at a minimum at the opened front tip 136. The wall thickness is at a maximum in a rear section 164 of the tubular portion 130 and is substantially constant along this rear section 164. The diameter of the inner peripheral wall surface 132 of the tubular portion 130 is at a maximum in the rear section 164 of the tubular portion 130, the diameter of the inner peripheral wall surface 132 of the tubular portion 130 varies along the front and rear sections 160, 164. In the illustrated example, the wall thickness of the tubular portion 130 is preferably about 1/32 inch or less. The diameter of the outer peripheral wall surface 134 can be, for instance, about 0.240 inch at the opened front tip 136. These values are examples only and other values are possible as well. However, a smaller outer diameter will require a tapped hole having a smaller diameter. This will be less damaging for the tree.

The illustrated spout 300 is configured to be considered as "thin-walled". It can be constructed as disclosed in U.S. patent application Ser. No. 13/345,373 filed 6 Jan. 2012 (now U.S. Pat. No. 8,677,682 issued 25 Mar. 2014), which is hereby incorporated by reference in its entirety. The spout 300 can be inserted into the tapped hole 110 in direction of arrow 166, as shown semi-schematically in FIG. 2. The radially-flexible wall of the front section 160 of the tubular portion 130 will be squeezed radially inwards. The material has a certain elasticity and with this construction, the spout 300 can be designed so as to adapt to the small variations of the diameter of the tapped hole 110. Unlike conventional rigid spouts, this spout 300 can be easily inserted by hand without the need of a tool, for instance a hammer or the like. It is inserted in place with a slight rotation until it holds in place. Even inserted by hand in a hole that is slightly conical in shape, the spout 300 will be substantially sealed and significantly less prone to disconnection from the tapped hole 110 by itself following multiple freeze/thaw cycles. This considerably reduces the maintenance during the sap harvesting season.

In the spout 300 as illustrated, the outer peripheral wall surface 144 of the tubing fixation portion 140 has a diameter that is generally decreasing towards the opened rear tip 146. The decrease is substantially constant over an end section 170 of the tubing fixation portion 140. The edge surface surrounding the opened rear tip 146 at the rear end of the end section 170 has a curved shape so as to facilitate the insertion inside the free end of the flexible tubing 106. This tubing fixation portion 140 also has a root section 172 near the handgrip 150 where the outer peripheral wall surface 144 is substantially cylindrical. The diameter of the outer peripheral wall surface 144 is substantially constant at the root section 172. Variants are possible as well.

FIG. 5 further shows that the handgrip 150 of the illustrated spout 300 has a rear side surface forming an annular seat 174 all around the outer peripheral wall surface 144 of the tubing fixation portion 140. This way, if the free end of the flexible tubing 106 can be inserted far enough so as to cover the entire outer peripheral wall surface 144 of the tubing fixation portion 140, the flat rear surface of the annular seat 174 will enhance the sealing engagement. It may be the case of a free end that was used for a number of years and where the material was have permanently expanded over time. The tubing fixation portion 140 can be designed so as to be only partially inserted thereon when the free end portion is new. Variants are possible as well.

Figure 6:
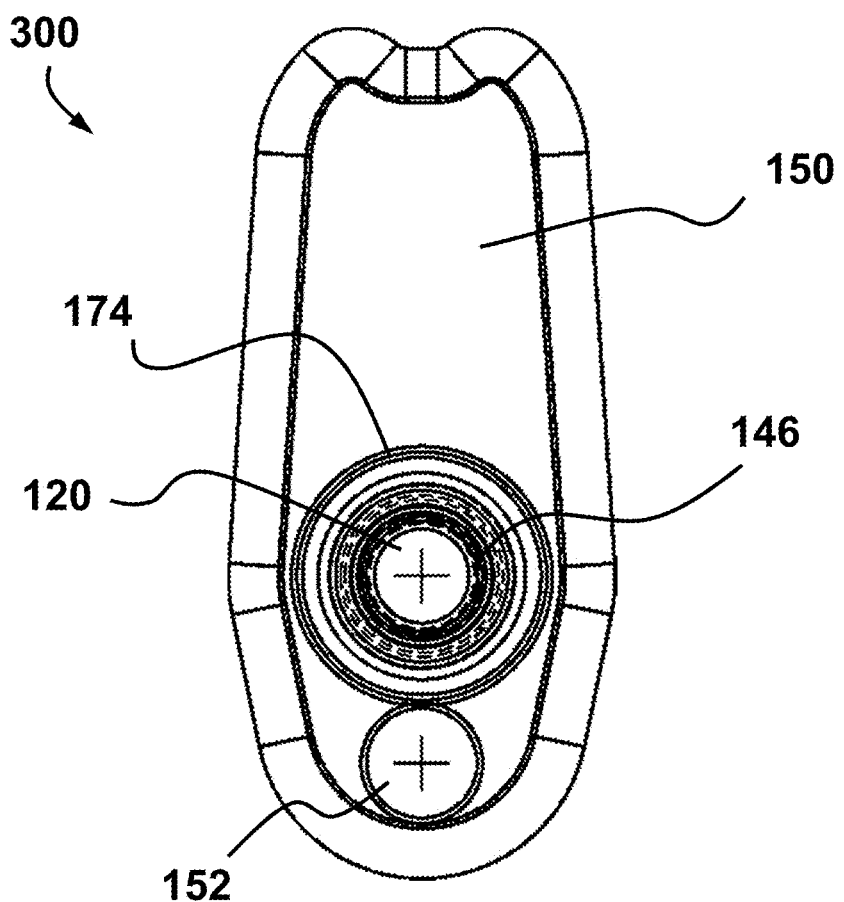
FIG. 6 is a rear view of the spout shown in FIG. 1.

FIG. 6 is a rear view of the spout 300 shown in FIG. 1.

Figure 7:
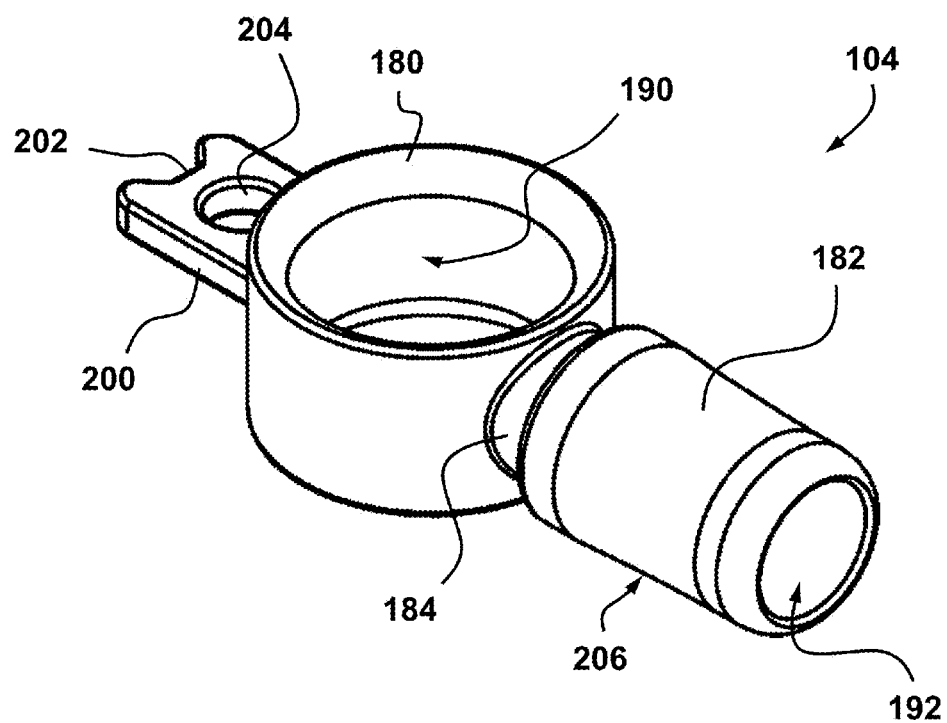
FIG. 7 is an isometric view of the slide clamp used in the sap collecting arrangement of FIG. 1.

FIG. 7 is an isometric view of the slide clamp 104 shown in FIG. 1. The slide clamp 104 includes an annular sleeve portion 180 and a plug portion 182. The sleeve portion 180 and the plug portion 182 of the illustrated slide clamp 104 are interconnected through a substantially cylindrical intervening portion 184. The illustrated slide clamp 104 has a monolithic construction and has no moving parts. It can be made of a plastic material using an injection-molding process where all portions are molded together at the same time. Variants are possible as well.

The sleeve portion 180 has a tapered inner peripheral wall surface 190. It is easily slidingly insertable over the unexpanded outer diameter of the flexible tubing 106. The slide clamp 104 is also removably positionable proximate the free end of the flexible tubing 106, when the free end of the flexible tubing 106 is inserted over the tubing fixation portion 140, to constrict the free end of the flexible tubing 106 in a withdrawal-resisting frictional engagement with the tubing fixation portion 140. This way, the free end of the flexible tubing 106 will be squeezed onto the tubing fixation portion 140 of the spout 300. The slide clamp 104 can be moved by hand into position, for instance upon rotating it and progressively moving it at the same time. The tapered inner peripheral surface 190 varies between a minimum inner diameter and a maximum inner diameter. The inner diameter of the tapered inner peripheral surface 190 is maximum at opposite side edges of the sleeve portion 180 and the inner diameter is minimum in-between the opposite side edges. The minimum inner diameter is preferably equal or more than the unexpanded outer diameter of the flexible tubing 106 so that the slide clamp 104 can be easily moved along the outer surface of the flexible tubing 106. However, the minimum inner diameter is less than the expanded outer diameter of the flexible tubing 106 for generating the withdrawal-resisting frictional engagement.

Figure 8:
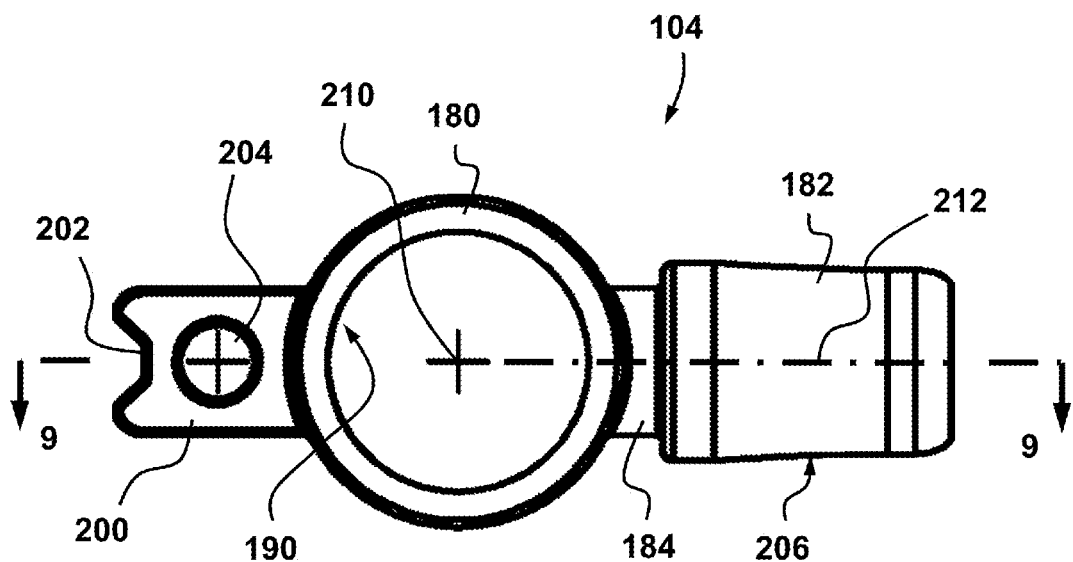
FIG. 8 is a front view of the slide clamp shown in FIG. 7.

FIG. 8 is a front view of the slide clamp 104 shown in FIG. 1.

Figure 9:
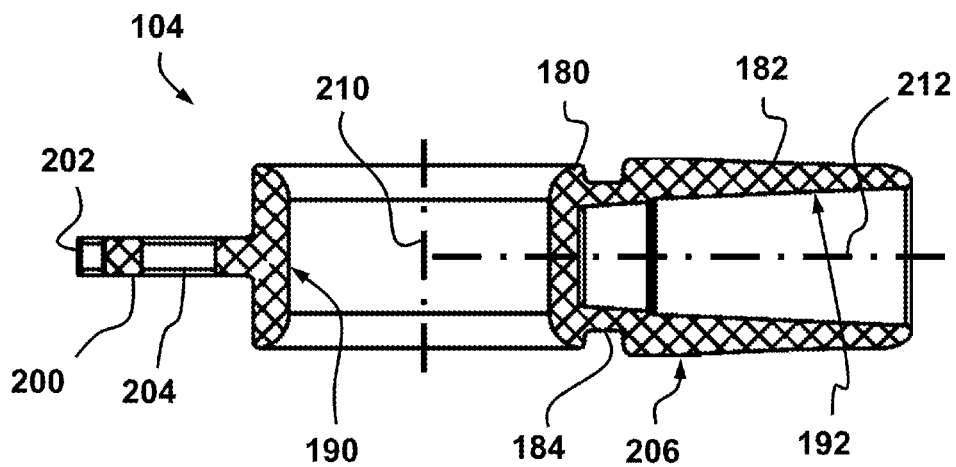
FIG. 9 is a cross-sectional view of the slide clamp taken along line 9-9 in FIG. 8.

FIG. 9 is a cross-sectional view of the illustrated slide clamp 104 taken along line 9-9 in FIG. 8. As can be seen, the plug portion 182 of the slide clamp 104 has a tapered inner peripheral wall surface 192 forming a socket. The socket is opened only at the tip of the plug portion 182. The tapered inner peripheral wall surface 192 of the plug portion 182 has a circular cross section and at least a section thereof is smooth and uninterrupted. In the illustrated example, the inner peripheral wall surface 192 is tapered and has a smaller inner diameter to hold the outer front tip 136 during storage, for instance once the spout 300 has been cleaned and sanitized. In use, the front section 160 of the tubular portion 130, when unconnected from the tapped hole 110, can be removably insertable in a friction-tight and sealed manner.

The illustrated slide clamp 104 also includes a side tab portion 200 projecting orthogonally from the outer side of the sleeve portion 180. This side tab portion 200 is substantially flat in the example, with the main opposite surfaces running parallel to the radial plane of the tapered inner peripheral wall surface 190 of the sleeve portion 180. It is positioned opposite to the plug portion 182 and includes a notched tip 202. A hole 204 is also provided across the two main opposite surfaces of the side tab portion 200. The hole 204 can be used to attach and/or to support the slide clamp 104, for instance using a wire or the like. Variants are possible as well.

The plug portion 182 includes a tapered outer peripheral wall surface 206 on which the free end of the flexible tubing 106 can be removably inserted to sealingly close the free end thereof. This allows the spout 300 to be removed during and/or after the annual cleaning/sanitization. Closing the free end of the flexible tubing 106 will maintain the negative or positive pressure inside the flexible tubing network during the annual cleaning/sanitization. It can also allow the free end of the flexible tubing 106 to be closed during the sap harvesting season if the spout 300 is removed for some reason, such as for repairs. Another feature of the proposed concept is that the operator can remove some portions of the flexible tubing network and transport it elsewhere in the sugar bush while keeping the interior of the parts clean and sealed.

Figure 10:
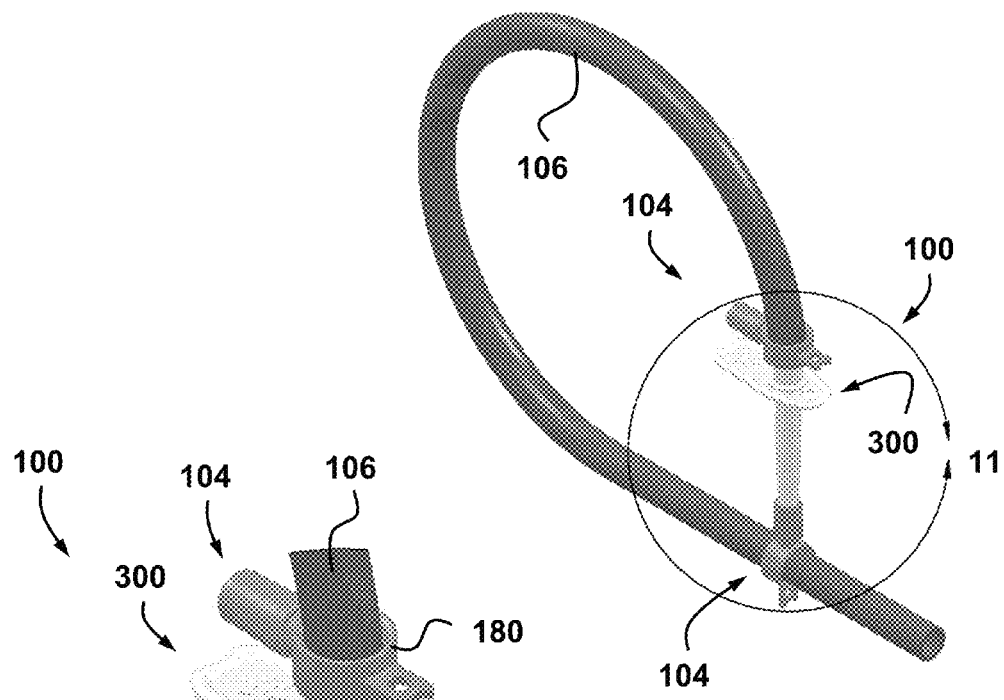
FIG. 10 is an isometric view illustrating the spout in the arrangement of FIG. 1 being connected to a second slide clamp mounted on the same flexible tubing.
Figure 11:
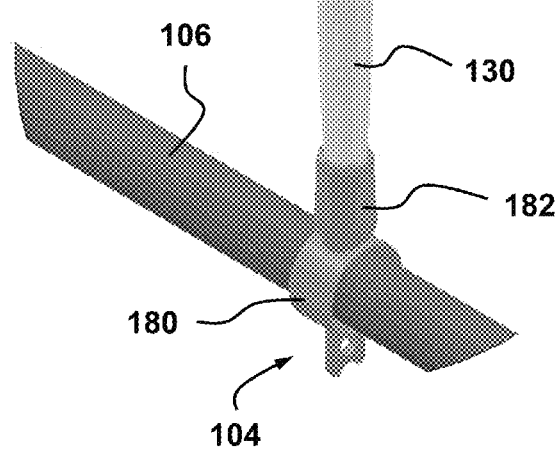
FIG. 11 is an enlarged view of what is shown in FIG. 10.

FIG. 10 is an isometric view illustrating the spout 300 of FIG. 1 being connected to a second slide clamp 104 mounted on the same flexible tubing 106. FIG. 11 is an enlarged view of what is shown in FIG. 10. The flexible tubing 106 is set into a loop as shown. The arrangement 100 thus have more than one slide clamp 104.

In the illustrated example, the tapered inner peripheral wall surface 190 of the sleeve portion 180 and the tapered inner peripheral wall surface 192 of the plug portion 182, each having an axis of symmetry 210, 212. Both axes of symmetry 210, 212 are substantially orthogonal from one another in the illustrated example. Variants are possible as well.

Figure 12:
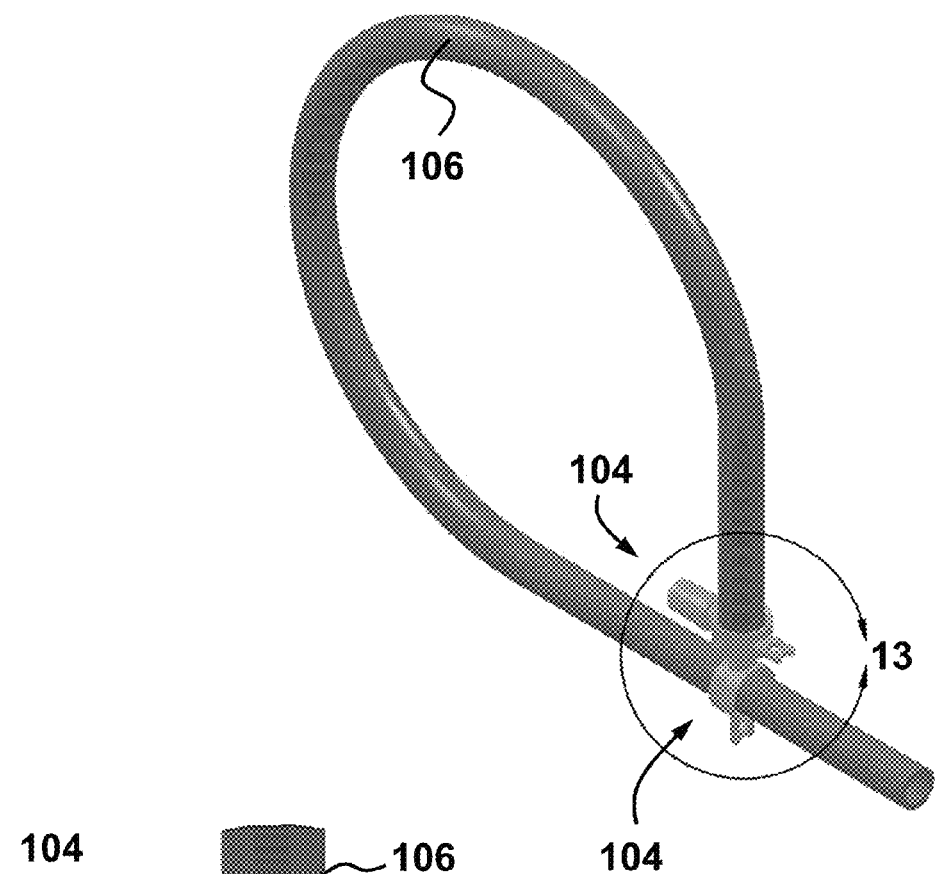
FIG. 12 is an isometric view illustrating an example of an implementation where the free end of the flexible tubing is closed by the plug portion of a second slide clamp mounted thereon and where the first slide clamp constricts the free end of the flexible tubing in a withdrawal-resisting frictional engagement with the plug portion of the second slide clamp.
Figure 13:
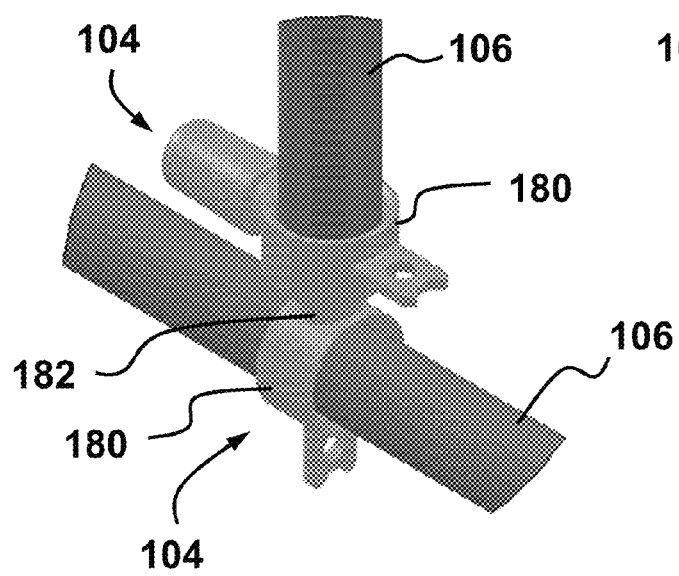
FIG. 13 is an enlarged view of what is shown in FIG. 12.

FIG. 12 is an isometric view illustrating an example of an implementation where the free end of the flexible tubing 106 is closed by the plug portion 182 of a second slide clamp 104 mounted thereon and where the first slide clamp 104 constricts the free end of the flexible tubing 106 in a withdrawal-resisting frictional engagement with the plug portion 182 of the second slide clamp 104. FIG. 13 is an enlarged view of what is shown in FIG. 12. As can be seen, the flexible tubing 106 is set into a loop. The two slide clamps 104 provide an air-tight and water-tight seal to prevent air and contaminants from entering. As aforesaid, this can be very useful during the off-season or to close an open free end of a flexible tubing 106 that is disconnected from a corresponding spout 300 for some reasons when it is operated under vacuum conditions. The plug portion 182 of the second slide clamp 104 is thus used as a sealing plug.

With the arrangement 100, removing the free end of the flexible tubing 106 can be done easily by rotating the slide clamp 104 and moving it at the same time away from the free end. Once the slide clamp 104 is away, the force created to squeeze the free end will be lower and the free end should detach relatively easily, for instance by moving the flexible tubing 106 sideways to create an angle with the tubing fixation portion 140. Since serrations can be omitted, the withdrawal of the free end will require less force and the damages to the free end will generally be minor. Using the same free end once again will be possible. Conventional serrations also generally tend to be larger in diameter in most designs. The use of the slide clamp 104 mitigates a premature plastic deformation of the flexible tubings 106.

Overall, less air will enter the tubing network during the operation under vacuum conditions. It was found that this mitigates the freezing of sap under outside temperatures that are slightly below the freezing point. The sap can continue to flow down to a few degrees Celsius when air is prevented from entering the network through very small interstices. The arrangement 100 provides a very good sealing at each of the connections and these small air infiltrations can be eliminated if the arrangement 100 is designed and used properly. Thus, sap can be harvested at lower temperatures than ever before.

The various parts of the sap collecting arrangement 100 can be used on a permanent sap collecting system (where most of the system will remain in the forest during the off-season), or on a sap collecting system where most of the system is removed at the end of each sap harvesting system. The arrangement 100 is thus very versatile.

FIGS. 14 to 21 illustrate various examples of sap collecting devices 102 that are not spouts.

Figure 14:
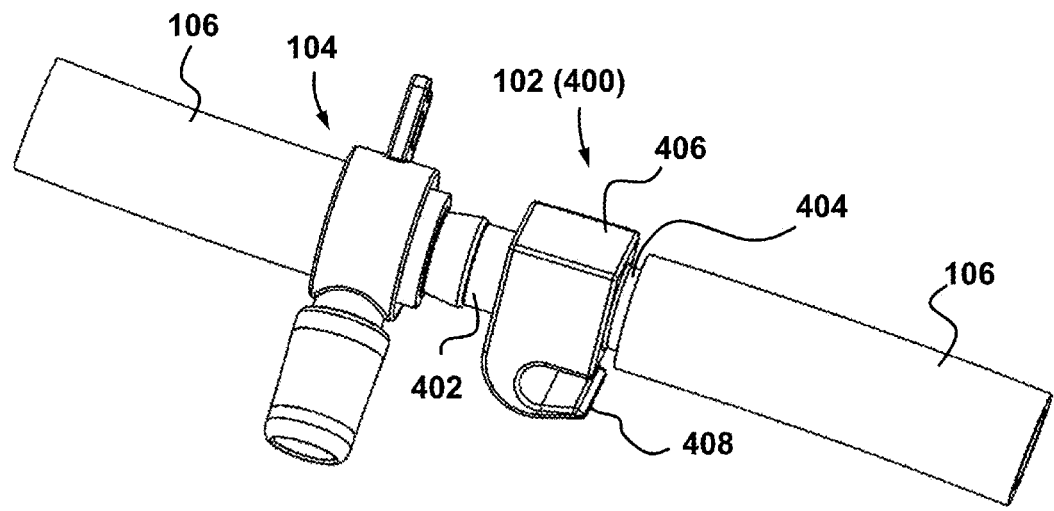
FIG. 14 illustrates one example of a sap collecting device that is not a spout.
Figure 15:
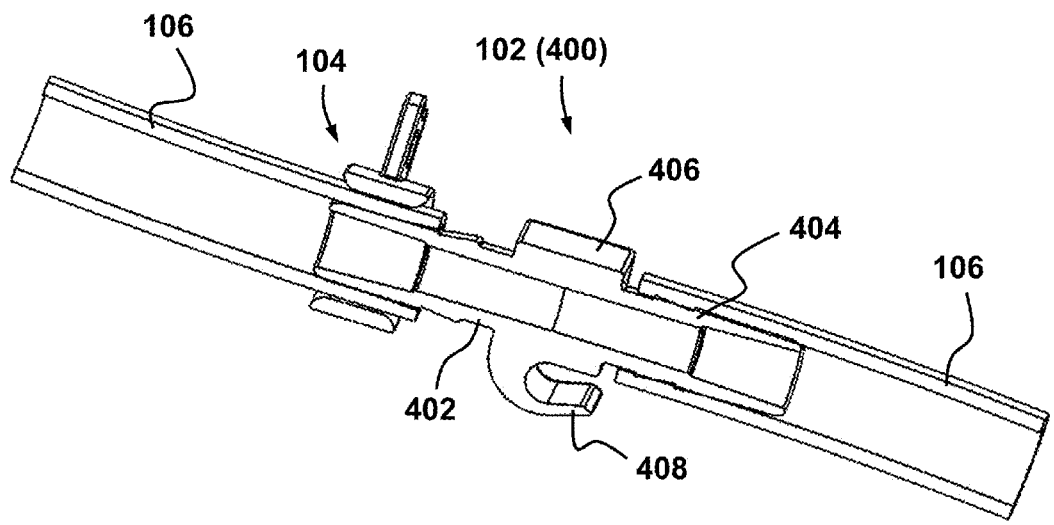
FIG. 15 is a cross section view of what is shown in FIG. 14.

In FIG. 14, the illustrated sap collecting device 102 is a union 400 that includes two opposite tubing fixation portions 402, 404. FIG. 15 is a cross section view of what is shown in FIG. 14. As can be seen, both tubing fixations portions 402, 404 are coaxially disposed and made integral with a center portion 406. The center portion 406 has with an internal channel therein to provide a fluid communication between the two opposite tubing fixation portions 402, 404. A hook 408 is made integral with the exterior of the center portion 406. The hook 408 can be used, for instance, to attach the union 400 to a wire. Variants are possible as well.

Figure 16:
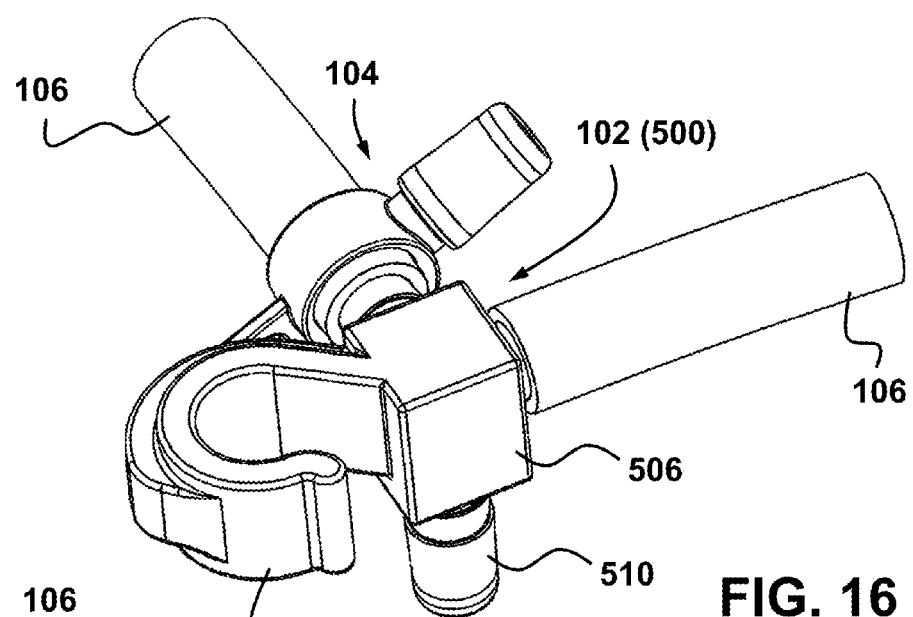
FIG. 16 illustrates another example of a sap collecting device that is not a spout.
Figure 17:
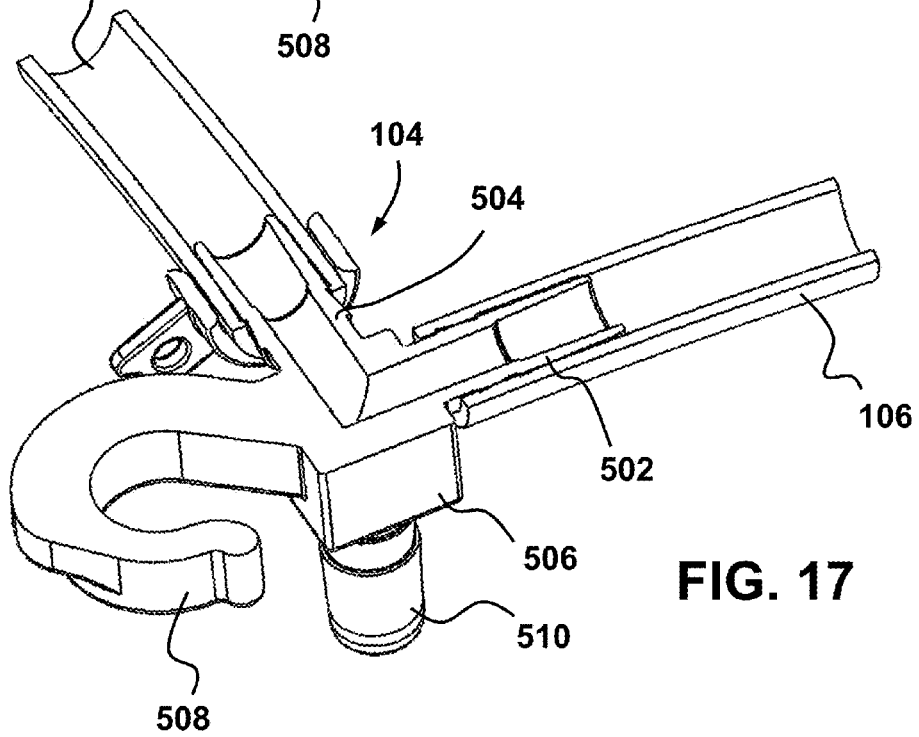
FIG. 17 is a cross section view of what is shown in FIG. 16.

In FIG. 16, the illustrated sap collecting device 102 is an end line fitting 500 that also includes two tubing fixation portions 502, 504 but they are disposed at right angle from one another. FIG. 17 is a cross section view of what is shown in FIG. 16. As can be seen, both tubing fixations portions 502, 504 are made integral with a center portion 506 that includes an internal channel therein to provide a fluid communication between the two tubing fixation portions 502, 504. A hook 508 is made integral with the exterior of the center portion 506. The hook 508 can be used, for instance, to attach the end line fitting 500 to a wire. The illustrated end line fitting 500 also features a plug portion 510, which can be for instance similar to the plug portion 182 of the slide clamp 104. The plug portion 510 can be used as a sealing plug to close an open free end of a flexible tubing 106 that is disconnected from a corresponding spout 300 and/or to close the tip of the spout 300. This can be very useful during the off-season or to for some reasons when it is operated under vacuum conditions. Variants are possible as well.

Figure 18:
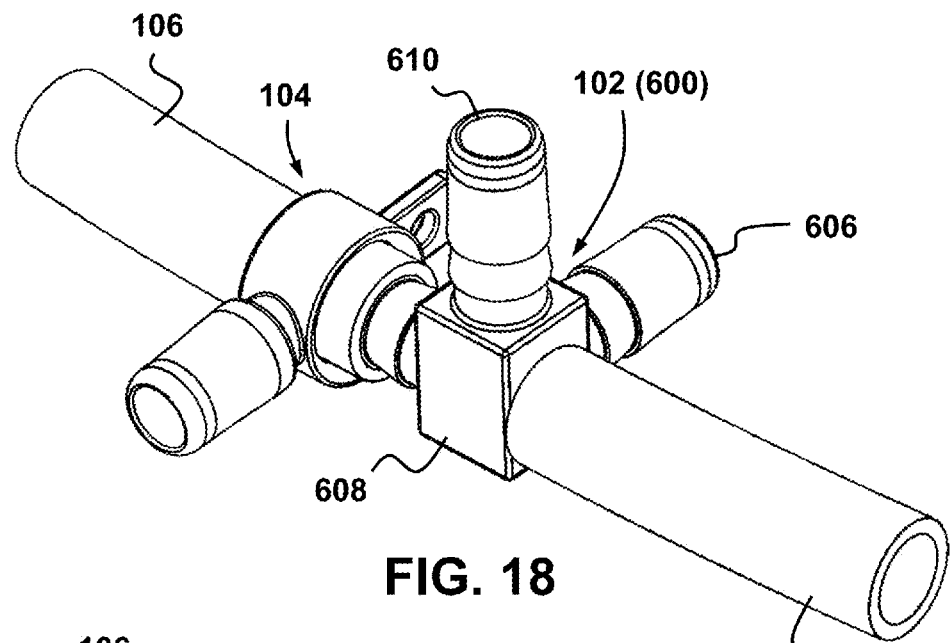
FIG. 18 illustrates another example of a sap collecting device that is not a spout.
Figure 19:
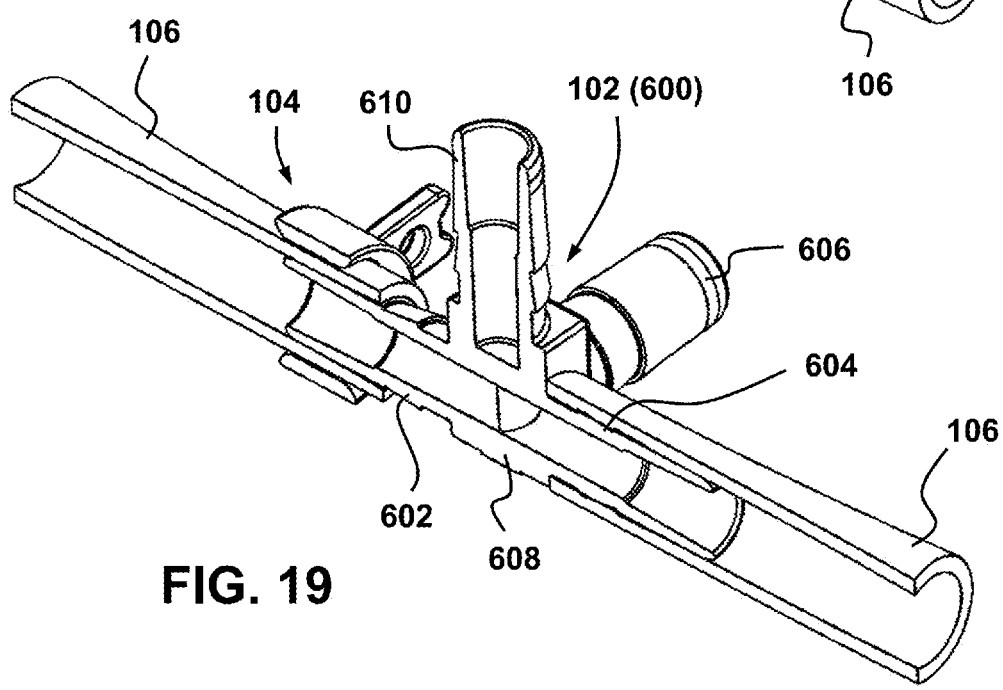
FIG. 19 is a cross section view of what is shown in FIG. 18.

In FIG. 18, the illustrated sap collecting device 102 is a connector 600 that includes three tubing fixation portions 602, 604, 606. FIG. 19 is a cross section view of what is shown in FIG. 18. As can be seen, the tubing fixation portions 602, 604, 606 are disposed around and made integral with a center portion 608. This center portion 608 has with internal channels therein to provide a fluid communication between the tubing fixation portions 602, 604, 606. The illustrated connector 600 also features a plug portion 610, which can be for instance similar to the plug portion 182 of the slide clamp 104. Variants are possible as well.

It should be noted that while FIGS. 14 to 19 show tubing fixation portions having small serrations thereon, these serrations are only superficial and are not used most of the time, as shown for instance in FIGS. 15, 17 and 19, when a slide clamp 104 is provided thereon.

Figure 20:
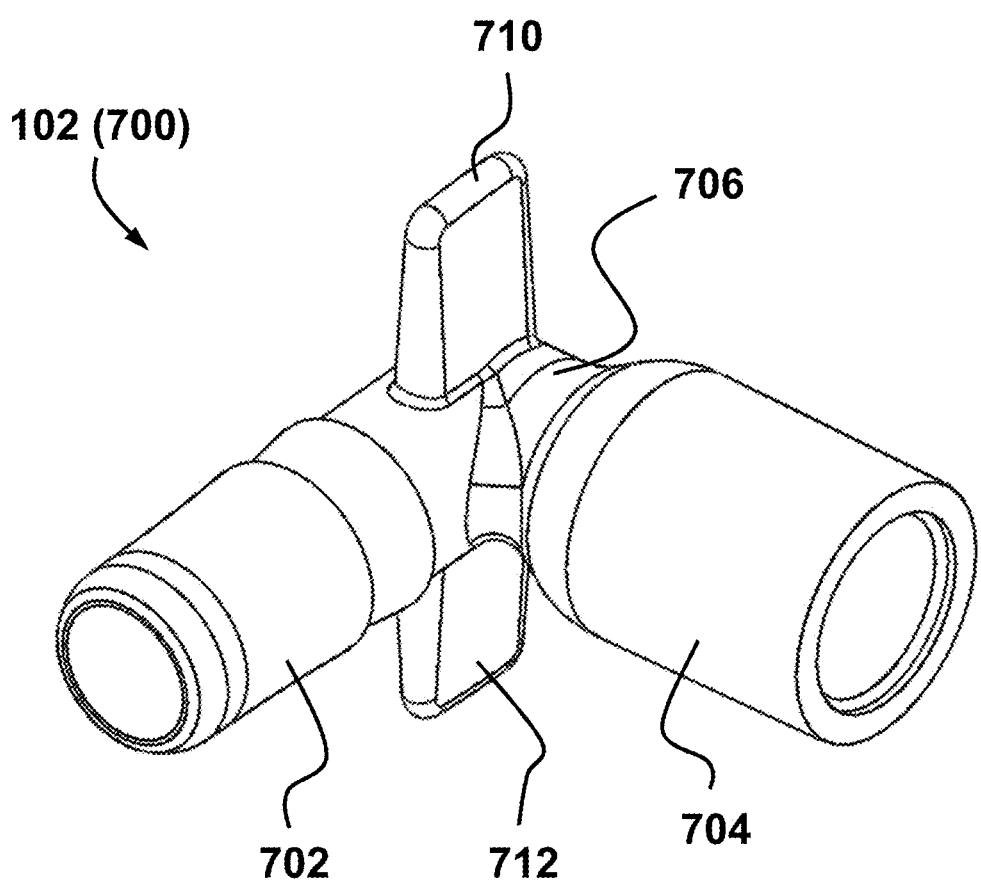
FIG. 20 illustrates an example of a sap collecting device that is a spout elbow.

In FIG. 20, the illustrated sap collecting device 102 is a spout elbow 700. This spout elbow 700 includes one tubing fixation portion 702 and also one socket 704. The tubing fixation portion 702 and the socket 704 are disposed at right angle at opposite ends of a center portion 706. The center portion 706 has an internal channel to provide a fluid communication between the tubing fixation portion 702 and the socket 704. A pair of opposite flanges 710, 712 are made integral with the exterior of the center portion 706. These flanges 710, 712 provide a grip for the fingers of the operator when handling the spout elbow 700.

Figure 21:
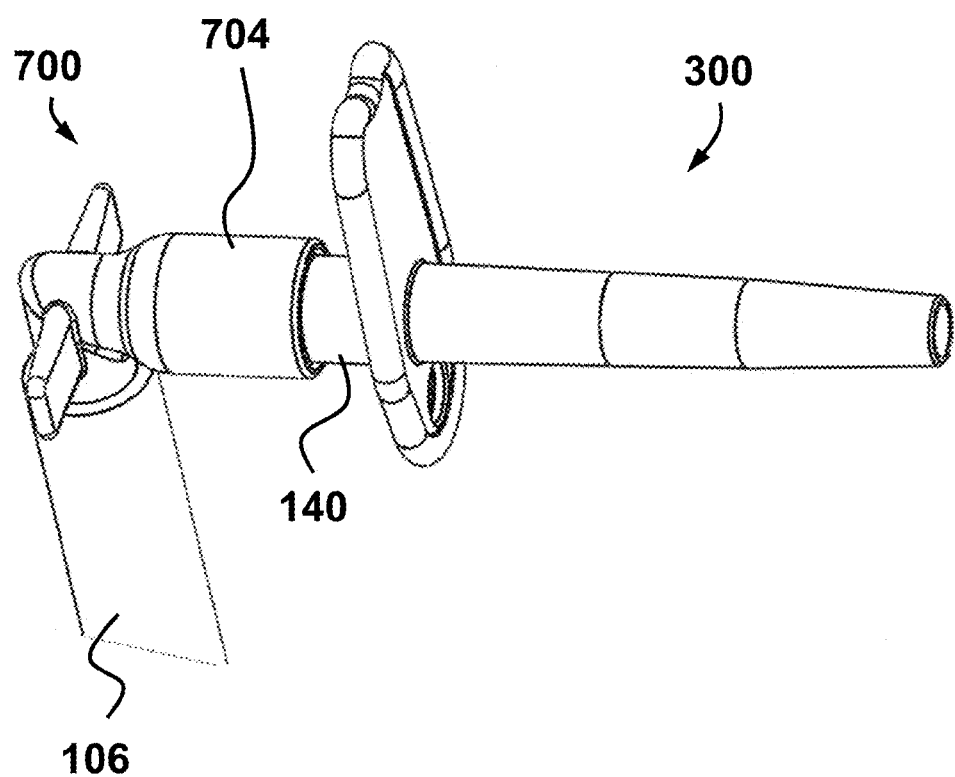
FIG. 21 is an isometric view of the spout elbow that is the sap collecting device of FIG. 20 and which is connected to an example of a spout.

FIG. 21 is an isometric view of the spout elbow 700 of FIG. 20 to which is connected a spout 300. The tubing fixation portion 140 of the spout 300 fits tightly into the socket 704 of the spout elbow 700. Although not shown, a slide clamp can be provided on the flexible tubing 106 and slid into position over the tubing fixation portion 702 of the spout elbow 700.

Figure 22:
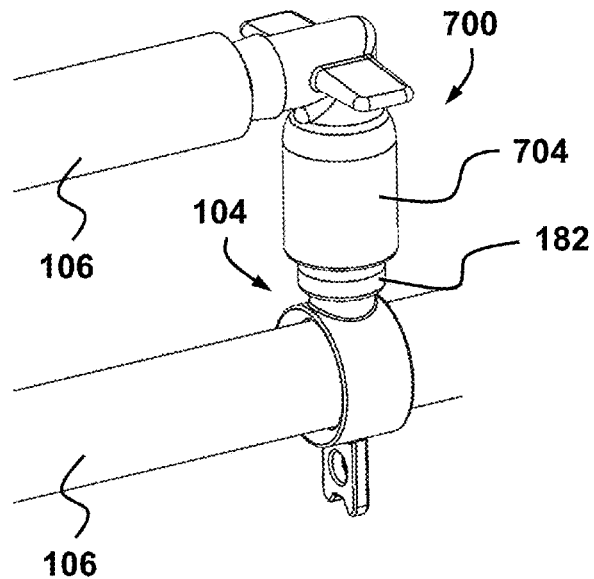
FIG. 22 is an isometric view of the spout elbow that is the sap collecting device of FIG. 20 and which is connected to an example of a slide clamp.
Figure 23:
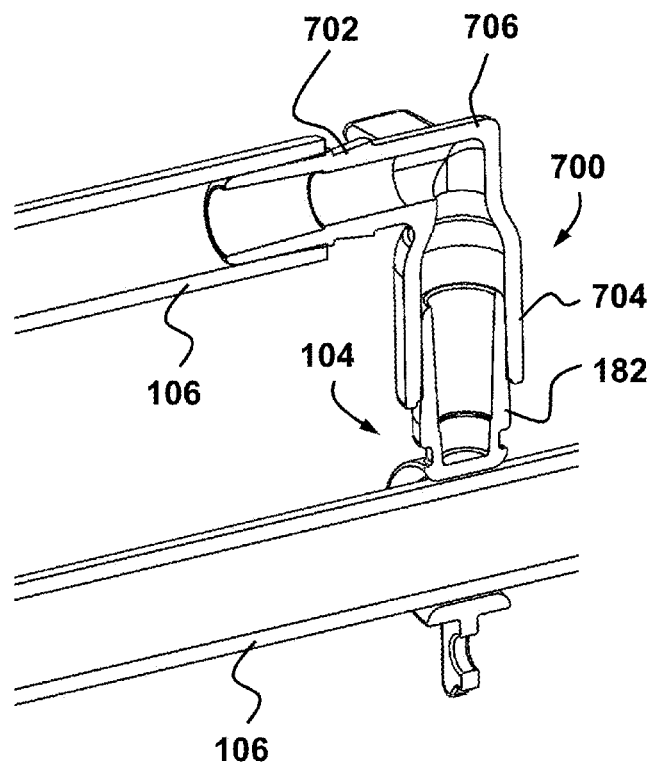
FIG. 23 is a cross section view of what is shown in FIG. 22.

FIG. 22 is also an isometric view of the spout elbow 700 but this time, the socket 704 is closed by the plug portion 182 of a slide clamp 104. FIG. 23 is a cross section view of what is shown in FIG. 22.

Other variants of sap collecting devices can be devised as well.

Figure 24:
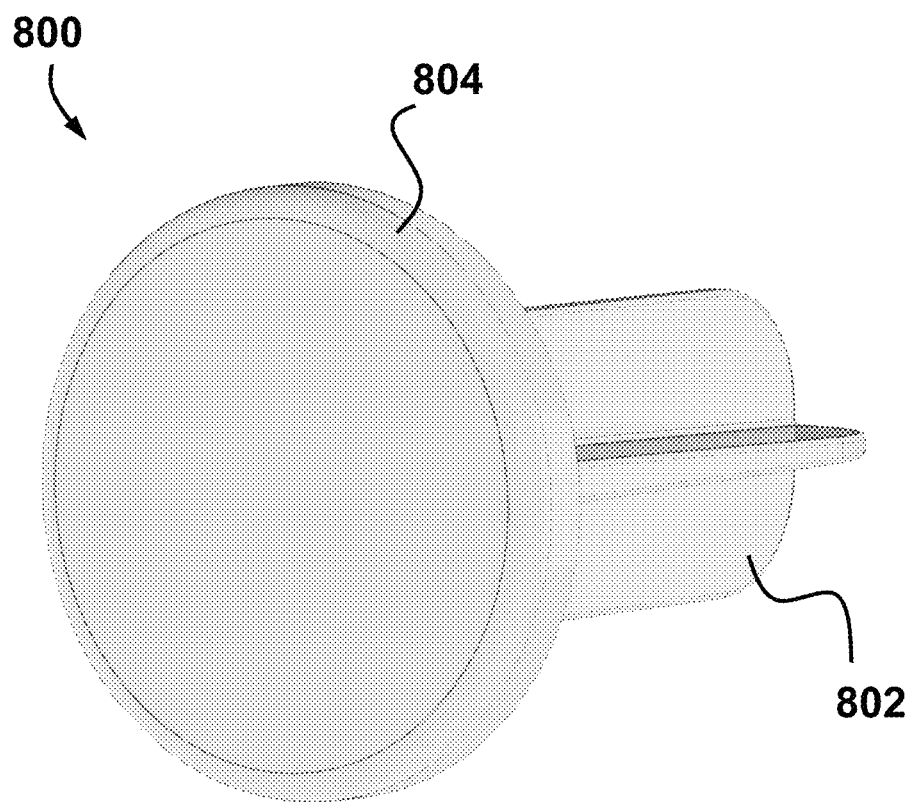
FIG. 24 is an isometric view illustrating an example of a visual indicator for marking the locations of tapped holes after a sap harvesting season.

FIG. 24 is an isometric view illustrating an example of a visual indicator 800 for marking the locations of tapped holes 110 after a sap harvesting season. The visual indicator 800 can be made, for instance, of a plastic material a very contrasting color with reference to the bark of the tree, for instance orange, red, yellow, etc. Variants are possible.

The visual indicator 800 has a first portion 802 to be inserted into a tapped hole with a light interfering engagement once the spout was removed, and a second portion 804 that is made integral or otherwise attached at the front end of the first portion 802. In the illustrated example, the first portion 802 is made of two perpendicular flat parts intersecting one another at right angle. The second portion 804 is larger in size that the first portion 802 and larger than the diameter of the tapped holes. It is also generally circular in shape when viewed from the front side. Nevertheless, variants are possible as well.

The visual indicator 800 can be useful for marking the locations of the tapped holes in view of the next sap harvesting season or seasons when small diameter tapped holes are made. This way, operators will more easily identify where the previous tapped holes were made so as to position the new ones not too close from the previous ones. The previous tapped holes can be difficult to locate when their diameters are small and if the bark surrounding the tapped holes are intact.

The present detailed description and the appended figures are meant to be exemplary only, and a skilled person will recognize that variants can be made in light of a review of the present disclosure without departing from the proposed concept.

LIST OF REFERENCE NUMERALS 100 arrangement
102 sap collecting device
104 slide clamp
106 flexible tubing
110 tapped hole
112 tree
120 inner sap channel
122 arrow
130 tubular portion
132 inner peripheral wall surface
134 outer peripheral wall surface
136 opened tip
140 tubing fixation portion
142 inner peripheral wall surface
144 outer peripheral wall surface
146 opened tip
150 handgrip
152 hole
160 front section
162 inner surface (of tapped hole)
164 rear section (of tubular portion)
166 arrow
170 end section (of tubing fixation portion)
172 root section (of tubing fixation portion)
174 annular seat
180 sleeve portion
182 plug portion
184 intervening portion
190 inner peripheral wall surface (of sleeve portion)
192 inner peripheral wall surface (of plug portion)
200 side tab portion
202 notched tip (of side tab portion)
204 hole (of side tab portion)
206 outer peripheral wall surface (of plug portion)
210 axis of symmetry
212 axis of symmetry
300 spout (sap collecting device 102)
400 union
402 tubing fixation portion (of union 400)
404 tubing fixation portion (of union 400)
406 center portion (of union 400)
408 hook (of union 400)
500 end line fitting
502 tubing fixation portion (of end line fitting 500)
504 tubing fixation portion (of end line fitting 500)
506 center portion (of end line fitting 500)
508 hook (of end line fitting 500)
510 plug portion (of end line fitting 500)
600 connector
602 tubing fixation portion (of connector 600)
604 tubing fixation portion (of connector 600)
606 tubing fixation portion (of connector 600)
608 center portion (of connector 600)
610 plug portion (of connector 600)
700 spout elbow
702 tubing fixation portion (of spout elbow 700)
704 socket (of spout elbow 700)
706 center portion (of spout elbow 700)
710 flange (of spout elbow 700)
712 flange (of spout elbow 700)
800 visual indicator
802 first portion (of visual indicator)
804 second portion (of visual indicator)

What is claimed is:

1. A sap collecting arrangement (100) for directing sap coming from a tapped hole (110) of a tree (112) into an open free end of a flexible tubing (106) operable under vacuum conditions, the flexible tubing (106) having an unexpanded inner diameter and an unexpanded outer diameter, the arrangement (100) including:
   a sap collecting device (102) having an inner sap channel (120) extending between an inlet and an outlet, the sap collecting device (102) including a tubing fixation portion (140) defining a part of the inner sap channel (120) and over which the free end of the flexible tubing (106) can be removably inserted with a frictional engagement, the tubing fixation portion (140) including an inner peripheral wall surface (142), an outer peripheral wall surface (144) having a circular cross section, and an opened tip (146), the outer peripheral wall surface (144) having at least a section with a diameter larger than the unexpanded inner diameter of the flexible tubing (106); and
   a slide clamp (104) having a monolithic construction, the slide clamp (104) including:
      an annular sleeve portion (180) having an inner peripheral wall surface (190) with a circular cross section, the sleeve portion (180) being slidingly insertable over the unexpanded outer diameter of the flexible tubing (106) and being removably positionable proximate the free end of the flexible tubing (106), when the free end of the flexible tubing (106) is inserted over the tubing fixation portion (140), to constrict the free end of the flexible tubing (106) in a withdrawal-resisting frictional engagement with the tubing fixation portion (140); and
      a plug portion (182) having an outer peripheral wall surface (206) with a circular cross section, the outer peripheral wall surface (206) of the plug portion (182) having at least a section with a diameter larger than the unexpanded inner diameter of the flexible tubing (106) and on which the free end of the flexible tubing (106) is removably insertable with a frictional engagement to prevent air and contaminants from entering.

2. The sap collecting arrangement (100) as defined in claim 1, wherein the outer peripheral wall surface (144) of the tubing fixation portion (140) is smooth.

3. The sap collecting arrangement (100) as defined in claim 1, wherein the outer peripheral wall surface (206) of the plug portion (182) is smooth.

4. The sap collecting arrangement (100) as defined in claim 1, wherein the diameter of the outer peripheral wall surface (144) of the tubing fixation portion (140) generally decreases towards the opened tip (146).

5. The sap collecting arrangement (100) as defined in claim 1, wherein the inner peripheral wall surface (190) of the sleeve portion (180) varies between a minimum inner diameter and a maximum inner diameter, the inner diameter of the inner peripheral wall surface (190) being maximum at opposite side edges of the sleeve portion (180) and the inner diameter being minimum in-between the opposite side edges, the minimum diameter being equal or more than the unexpanded outer diameter of the flexible tubing (106).

6. The sap collecting arrangement (100) as defined in claim 1, wherein the inner peripheral wall surface (190) of the sleeve portion (180) and the outer peripheral wall surface (206) of the plug portion (182) each have an axis of symmetry (210, 212), both axes of symmetry (210, 212) being substantially orthogonal from one another.

7. The sap collecting arrangement (100) as defined in claim 1, wherein the plug portion (182) includes a socket opened only at a tip of the plug portion (182), the socket having an inner peripheral wall surface (192) with a circular cross section.

8. The sap collecting arrangement (100) as defined in claim 7, wherein the inner peripheral wall surface (192) of the plug portion (182) is smooth.

9. The sap collecting arrangement (100) as defined in claim 1, wherein the slide clamp (104) is made of a plastic material.

10. The sap collecting arrangement (100) as defined in claim 1, wherein the sap collecting device (102) is a spout (300).

11. The sap collecting arrangement (100) as defined in claim 10, wherein the spout (300) includes an elongated tubular portion (130) defining another part of the inner sap channel (120), the tubular portion (130) including an inner peripheral wall surface (132), an outer peripheral wall surface (134) with a circular cross section, and an opened front tip (136) defining the inlet of the inner sap channel (120), the outer peripheral wall surface (134) of the spout (300) having a diameter that is generally increasing from the opened front tip (136) rearwards, the tubular portion (130) having a front section (160) that is radially flexible, the tubular portion (130) being partially and removably insertable into the tapped hole (110) with a frictional engagement generated by a contact of the outer peripheral wall surface (134) with an inner surface (162) of the tapped hole (110).

12. The sap collecting arrangement (100) as defined in claim 11, wherein the sap collecting arrangement (100) includes at least one of the following features:
the outer peripheral wall surface (134) of the tubular portion (130) is smooth;
the inner sap channel (120) of the spout (300) is substantially rectilinear between its inlet end and its outlet end;
the spout (300) has a monolithic construction and is preferably made of a plastic material.

13. The sap collecting arrangement (100) as defined in claim 11, wherein the spout (300) further includes a substantially flat external handgrip (150) located between the tubular portion (130) and the tubing fixation portion (140).

14. The sap collecting arrangement (100) as defined in claim 13, wherein the inner sap channel (120) is offset with reference to a geometrical center of the handgrip (150).

15. The sap collecting arrangement (100) as defined in claim 13, wherein the handgrip (150) includes a rear side surface forming an annular seat (174) all around the outer peripheral wall surface (144) of the tubing fixation portion (140).

16. The sap collecting arrangement (100) as defined in claim 11, wherein the tubular portion (130) has a wall thickness between its inner peripheral wall surface (132) and its outer peripheral wall surface (134) that increases lengthwise, the thickness being at a minimum at the opened front tip (136).

17. The sap collecting arrangement (100) as defined in claim 16, wherein the wall thickness is at a maximum in a rear section (164) of the tubular portion (130), the wall thickness being substantially constant along the rear section (164).

18. The sap collecting arrangement (17) as defined in claim 17, wherein the sap collecting arrangement (100) includes at least one of the following features:
the diameter of the inner peripheral wall surface (132) of the tubular portion (130) is at a maximum in the rear section (164);
the diameter of the inner peripheral wall surface (132) of the tubular portion (130) is substantially constant along the rear section (164);
the wall thickness of the tubular portion (130) at the opened front tip (136) is about 1/32 inch or less.

19. The sap collecting arrangement (100) as defined in claim 11, wherein the inner peripheral wall surface (132) of the tubular portion (130) has a diameter that is generally increasing from the opened front tip (136) rearwards.

20. The sap collecting arrangement (100) as defined in claim 1, wherein the plug portion (182) includes a socket opened only at a tip of the plug portion (182), the socket having an inner peripheral wall surface (192) with a circular cross section to receive an opened tip (136) of a tubular portion (130) when unconnected from the tapped hole (110), the opened tip (136) being removably insertable in a friction-tight and sealed manner into the socket of the plug portion (182), the inner peripheral wall surface (192) of the plug portion (182) being preferably smooth.

* * * * *